Jan. 9, 1923.

E. F. COLLINS.
ICE CREAM FREEZER.
FILED SEPT. 2, 1921.

1,441,832.

Inventor
E. F. Collins
By D. Swift
Attorney

Patented Jan. 9, 1923.

1,441,832

UNITED STATES PATENT OFFICE.

ELIZABETH F. COLLINS, OF WEST BANGOR, NEW YORK.

ICE-CREAM FREEZER.

Application filed September 2, 1921. Serial No. 498,124.

*To all whom it may concern:*

Be it known that I, ELIZABETH F. COLLINS, a citizen of the United States, residing at West Bangor, in the county of Franklin, State of New York, have invented a new and useful Ice-Cream Freezer; and I do hereby declare the following to be a full, clear, and exact description of the invention, such as will enable others skilled in the art to which it appertains to make and use the same.

The invention relates to ice cream freezers and has for its object to provide a conically shaped receptacle adapted to be disposed centrally in the ice-cream can after the paddle has been removed after a freezing operation, said receptacle being adapted to receive ice and salt and to form a centrally disposed core whereby softening centrally of the ice cream will be prevented and the cream may be kept from melting for a considerably longer time than at present.

A further object is to provide a core for an ice cream can, said core comprising a conically shaped receptacle having its apex end downwardly disposed, said receptacle being adapted to be imbedded centrally into the ice cream after an agitating and freezing operation.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1:
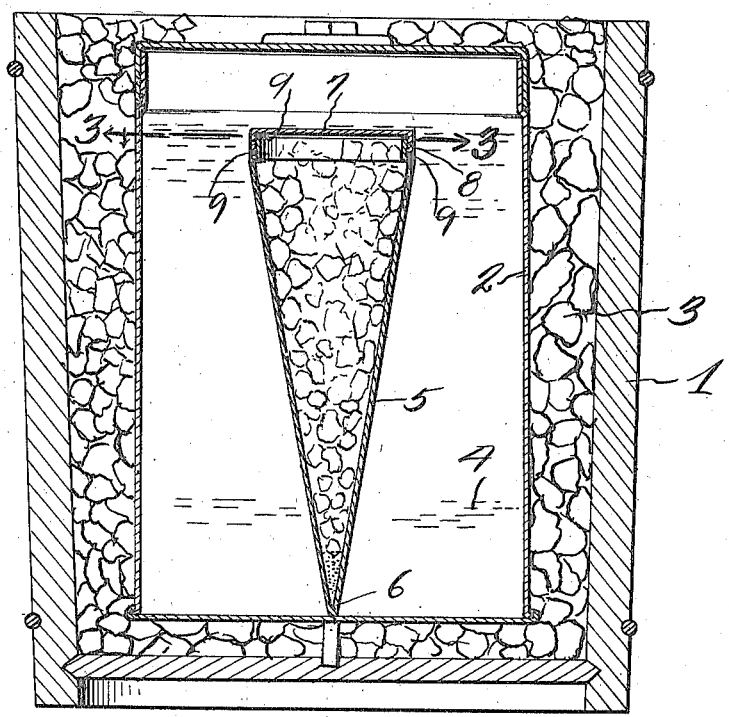
Figure 1 is a vertical sectional view through a conventional form of ice cream freezer showing the core disposed within the cream receptacle.
Figures 2, 3:
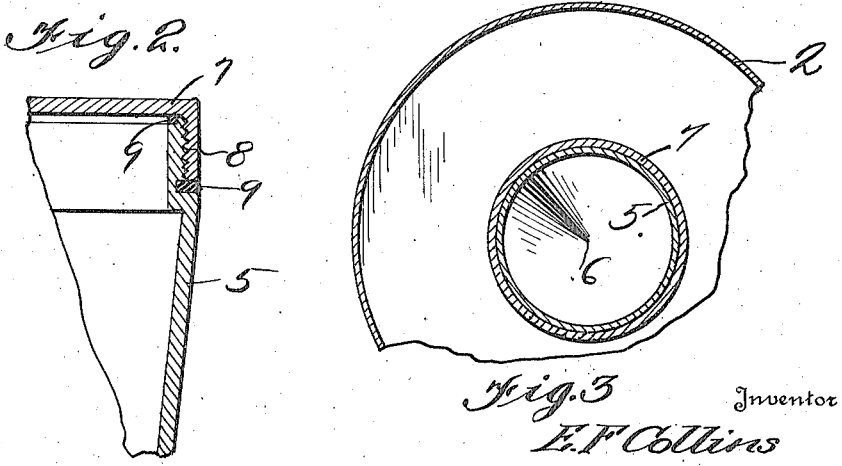
Figure 2 is a vertical detail sectional view on an enlarged scale through the upper corner of the receptacle, showing packing means for preventing escape of salt from the receptacle.
Figure 3 is a horizontal sectional view taken on line 3—3 of Figure 1.

Referring to the drawings, the numeral 1 designates an ice cream freezer bucket which is of usual construction and formed from wood. Disposed within the bucket 1 is a cream receptacle 2, which receptacle is of the usual construction and has disposed between the outer wall thereof and the inner wall of the bucket 1, ice 3, with which ice the cream 4 within the receptacle 2 is frozen. It has been found that the center of the ice cream 4 does not readily freeze, and that there is a soft center centrally of the cream after the dash has been removed after an agitating operation. It has also been found that if the cream is thoroughly frozen centrally that it stays hard for a considerably longer time than it does at present. To overcome the above difficulties a conically shaped receptacle 5 is provided which receptacle is adapted to receive ice and salt and has its apex end 6 forced downwardly into the ice cream 4 centrally thereof. By forming the receptacle 5 conically shaped, it will be seen that said receptacle can be forced into the center of the cream by the operator. The upper end of the receptacle 5 is provided with a removable cover 7 which is threaded at 8 on the receptacle 5 and interposed between said cover and shoulders of the receptacle 5, gaskets 9 are placed, which gaskets prevent seepage of salt water from the conically shaped receptacle 5 into the cream 4.

From the above it will be seen that a core is provided for ice cream cans, which core may be easily and quickly disposed within the cream, and by being conically shaped will pierce the cream in its downward movement.

The invention having been set forth what is claimed as new and useful is:

The combination with an ice cream can having ice cream therein, of a conically shaped removable ice and salt receptacle disposed within the ice cream can, said conically shaped receptacle being adapted to be forced into the ice cream with its apexed end downwardly disposed and a removable cover carried by said conically shaped receptacle and forming its base.

In testimony whereof I have signed my name to this specification in the presence of two subscribing witnesses.

ELIZABETH F. COLLINS.

Witnesses:
 FRANK M. BURBOUR,
 BYRON T. FISH.